United States Patent [19]

Wayne et al.

[11] 4,176,327
[45] Nov. 27, 1979

[54] METHOD FOR CAVITY DUMPING A Q-SWITCHED LASER

[75] Inventors: Robert J. Wayne, Glastonbury; Peter P. Chenausky, Avon; Carl J. Buczek, Manchester, all of Conn.

[73] Assignee: United Technologies Corporation, Hartford, Conn.

[21] Appl. No.: 872,274

[22] Filed: Jan. 25, 1978

[51] Int. Cl.$^2$ ............................................. H01S 3/11
[52] U.S. Cl. .......................... 331/94.5 M; 331/94.5 C; 331/94.5 Q
[58] Field of Search ................... 331/94.5 C, 94.5 M, 331/94.5 D, 94.5 Q

[56] References Cited

U.S. PATENT DOCUMENTS

| | | | |
|---|---|---|---|
| 3,521,069 | 7/1970 | DeMaria et al. | 331/94.5 Q |
| 3,757,249 | 9/1973 | Carman, Jr. et al. | 331/94.5 Q |

OTHER PUBLICATIONS

Kiefer et al., Intracavity CdTe Modulators for $CO_2$ Lasers, IEEE J. Quant. Electr., vol. QE. 8, No. 2 (Feb. 1972), pp. 173-179.
Bridges et al., Spontaneous Self-Pulsing and Cavity Dumping in a $CO_2$ Laser with Electro-Optic Q-Switching, Appl. Phys. Lett., vol. 14, No. 9 (May 1, 1969), pp. 262-264.
Christmas et al., Precise P.T.M. Control of a Ruby Laser, Electronics Letters, vol. 6, No. 22 (Oct. 29, 1970), pp. 696-697.

Primary Examiner—William L. Sikes
Attorney, Agent, or Firm—Lawrence A. Cavanaugh

[57] ABSTRACT

A method for cavity dumping a Q-switched laser having a gaseous gain medium to obtain submicrosecond output pulses, typically controllably variable between ten and three hundred nanoseconds at a high pulse repetition frequency typically up to at least twenty-five thousand pulses per second is disclosed. In a laser adapted for continuous wave operation, a combination of a retardation element and an electrooptic modulator provides a first polarization state to intracavity radiation incident onto an intracavity polarization coupler oriented to couple out of the cavity radiation having the first polarization state to provide a high loss condition to the cavity to maintain the laser below threshold. A voltage applied quickly to the modulator converts the first polarization state to a second polarization state to provide a low loss condition to the cavity to Q-switch the laser. Terminating the voltage near the maximum Q-switch buildup converts the polarization to the first polarization state which is cavity dumped by the polarization coupler to provide an output pulse. Controlling the fall time of the voltage termination controls the pulse width of the output pulse while controlling the duration of the voltage controls the energy of the output pulse.

13 Claims, 7 Drawing Figures

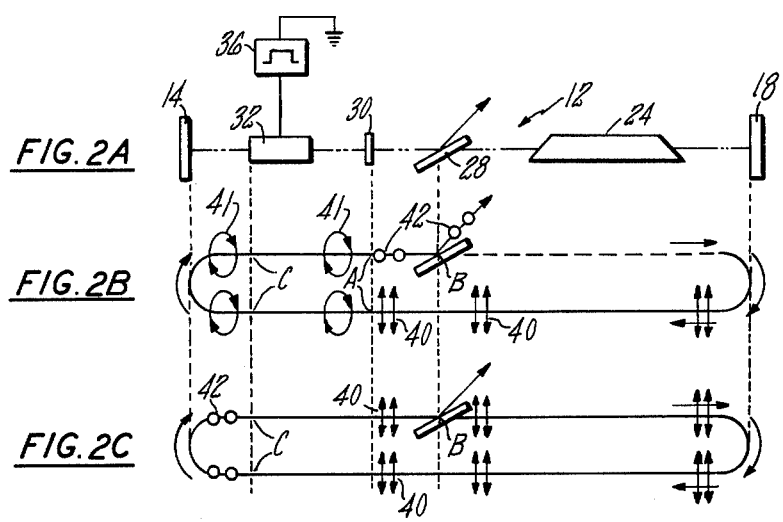
FIG. 2A
FIG. 2B
FIG. 2C
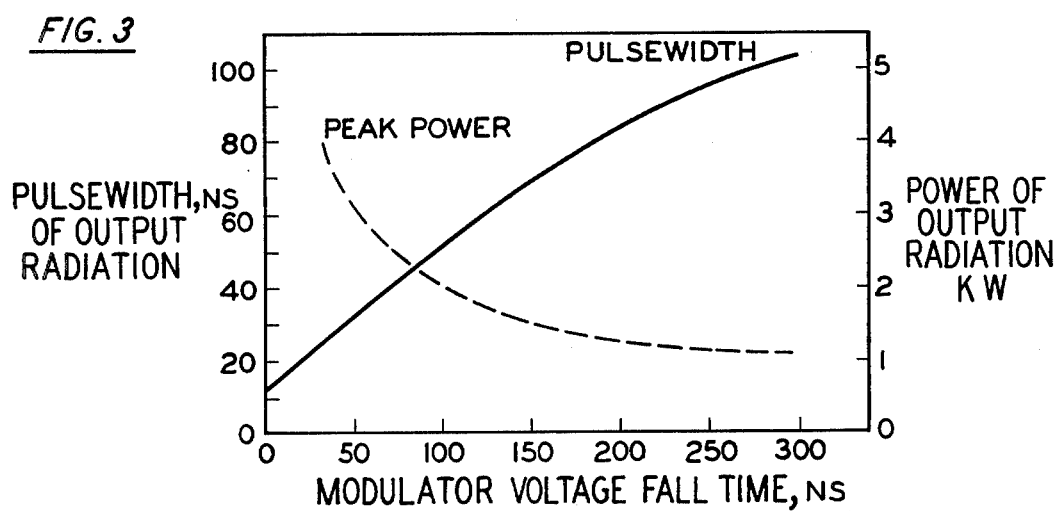
FIG. 3
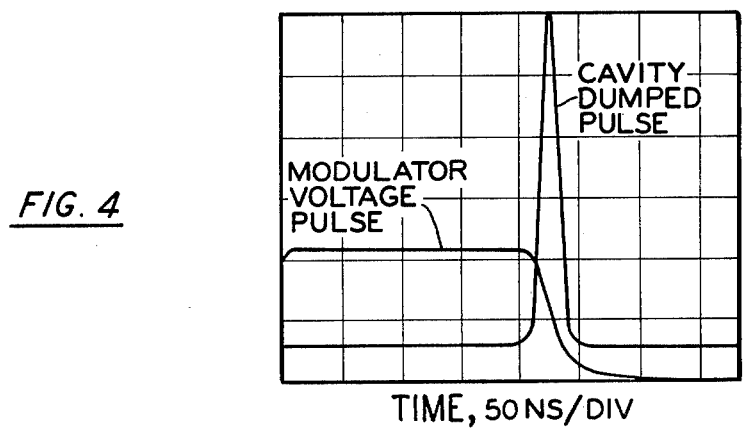
FIG. 4 ic Q Switching of the CO2 Laser" discloses the utilization of an electrooptic modulator to Q-switch a molecular laser. A sufficient voltage is first applied to the modulator to eliminate continuous wave oscillations within the laser. The voltage is then pulsed to zero to Q-switch the laser with the Q-switched pulse passing through an output mirror of the laser cavity. A gas absorption cell was inserted into the cavity to limit the bands of radiation oscillating within the cavity. Q-switched pulses having pulse widths of at least two hundred nanoseconds were obtained.

METHOD FOR CAVITY DUMPING A Q-SWITCHED LASER

The invention herein described was made in the course of or under a contract or subcontract thereunder with the Department of the Army.

BACKGROUND OF THE INVENTION

This invention relates to lasers and more particularly to a method for cavity dumping Q-switched radiation from a molecular laser to obtain pulses having submicrosecond duration with a high pulse repetition frequency.

The generation of pulses from a carbon dioxide laser having durations in the range of a few nanoseconds to three hundred fifty nanoseconds suitable for laser radar communication type applications is highly desirable. Pulses having this duration are difficult to achieve in part from the recognized difficulty of modulating carbon dioxide lasers in general and the fact that this range of pulse duration lies between two common techniques for modulating infrared molecular lasers: mode locking and intracavity Q-switching. The pulse duration of interest lies in the intermediate range when neither mode locking nor intracavity Q-switching would generate pulses which are of the desired duration. Mode locking techniques produce pulses of a few nanosecond duration which are too short for present day radar scenarios and have only a fixed pulse repetition frequency which may be unsuitable for many communication applications. Intracavity Q-switching techniques, either by saturable absorbers or by an electrooptical modulator, have difficulty producing pulses of less than three hundred nanoseconds at the full width half maximum point due to the dynamics of the upper energy level in the gain medium. A copending application entitled "Apparatus and Method for Cavity Dumping a Q-Switch Laser" Ser. No. 872,282 filed on even date herewith and held with the present application by a common assignee, discloses a method for the generation of short laser pulses from a laser having a gaseous gain medium operating in a continuous wave mode with the laser pulses having a pulse width capable of being varied from fifty to three hundred fifty nanoseconds at a pulse repetition frequency of up to twenty-five kilohertz utilizing a modulator incorporating a Stark effect gas.

For applications requiring pulses of laser radiation having moderate power and high pulse repetition frequencies, passive Q-switch saturable absorbers have been employed with carbon dioxide lasers. Skolnick et al in U.S. Pat. No. 3,764,937 filed Apr. 26, 1972 and held with the present application by a common assignee discloses a SF$_6$ saturable absorber to passively Q-switch a carbon dioxide laser having intracavity dispersive elements to prevent laser oscillations at lines for which the SF$_6$ has a low or zero absorption and to select the operating wavelength of the laser. In addition the cavity length is controlled to stabilize the output to a given pulse repetition frequency. For this configuration the intrapulse period is a function of the recovery time of the inversion of the carbon dioxide gain medium while the pulse tail is a function of the recovery time of the saturable absorber. A long pulse tail is undesirable for pulsed laser radar applications.

The generation of high peak power, temporally short (tens of nanosecond) pulses from a carbon dioxide laser cannot be easily achieved by passive Q-switching. Additionally, with passive Q-switching, the pulse repetition frequency is determined by the active medium and the saturable absorber medium dynamics. Active modulation offers the alternative of obtaining electronically controllable pulse widths and pulse repetition frequencies. Active intracavity modulation and Q-switching of a carbon dioxide laser can be accomplished in very short times at high rates with gaseous and solid crystalline modulators. However, fast switching to remove a high loss from the laser is not by itself sufficient to efficiently generate short high peak power pulses. Day et al in the IEEE Journal of Quantum Electronics, Vol. QE-6, No. 9, September 1970, in an article "Electrooptic Q Switching of the CO$_2$ Laser" discloses the utilization of an electrooptic modulator to Q-switch a molecular laser. A sufficient voltage is first applied to the modulator to eliminate continuous wave oscillations within the laser. The voltage is then pulsed to zero to Q-switch the laser with the Q-switched pulse passing through an output mirror of the laser cavity. A gas absorption cell was inserted into the cavity to limit the bands of radiation oscillating within the cavity. Q-switched pulses having pulse widths of at least two hundred nanoseconds were obtained.

Bridges et al in Applied Physics Letters, Vol. 14, No. 9, May 1, 1969 in an article entitled "Spontaneous Self-Pulsing and Cavity Dumping in a CO$_2$ Laser with Electro-Optic Q-Switching" discloses a technique for obtaining spontaneous self-pulsing from a carbon dioxide laser using an intracavity polarization coupler and an electrooptic crystal to Q-switch and cavity dump the intracavity radiation to obtain an output pulse having a pulse width of twenty nanoseconds. A high voltage is first applied to the modulator to obtain a high coupling loss condition. Q-switching to obtain a buildup of the optical flux within the cavity in the form of spontaneous self-pulsing is achieved by pulsing the voltage to zero. A pulse having a pulse width of twenty nanoseconds may then be dumped from the cavity by reflection from the polarization coupler, when the voltage is pulsed back to its original high DC level.

A laser beam transmitter having a moderate to high average power and which is efficient, frequency stable, capable of being pulsed in a variety of formats, as well as capable of achieving high peak powers, short pulse widths, and high pulse repetition rates with high interpulse and intrapulse frequency stability is desirable for radar systems. Implementation of such a pulsed laser transmitter in a coherent or heterodyne infrared radiation radar would provide a system capability for simultaneous high range and range rate measurement accuracy and the ability to engage multiple targets. Present methods of obtaining output pulses are not capable of producing pulses with pulse widths controllably variable from twenty to three hundred nanoseconds nor can they provide pulses at a high pulse repetition frequency.

SUMMARY OF THE INVENTION

An object of the present invention is to provide pulses of infrared radiation having a submicrosecond pulse width at a high repetition frequency.

According to the present invention a method of obtaining pulses of radiation having pulse widths capable of being controllably variable over a submicrosecond time interval with a laser having a gaseous gain medium, means for controlling the polarization state of radiation capable of oscillating within the laser, and means responsive to the polarization state for coupling out radiation from the laser comprises energizing the gain medium to obtain a population inversion therein capable of providing continuous wave radiation oscillating within the laser, maintaining the means for controlling the polarization state of the radiation within the laser to provide a first polarization state to at least a portion of the radiation incident onto the means responsive to the polarization state, wherein the means responsive to the polarization state is adapted for coupling out of the laser radiation having the first polarization state thereby providing a high coupling loss state to the laser to maintain the gain of the laser below threshold for producing an output beam, on switching the means for controlling the polarization state of the radiation to change quickly the first polarization state to a second polarization state wherein radiation having the second polarization state is transmitted through the means responsive to the polarization state thereby producing low coupling loss state to the laser to allow a Q-switch buildup of optical flux within the laser, off switching the means for controlling the polarization state of the radiation to change the second polarization state to the first polarization wherein the optical flux having the Q-switch buildup is cavity dumped by the means responsive to the polarization state to obtain an output pulse having a submicrosecond duration, and controlling the time duration of off switching the means for controlling the polarization state to control the pulse width of the output pulse.

A feature of the present invention is the polarization coupler adapted for coupling out from the cavity radiation having orthogonal linear polarization. An electrooptical crystal in combination with a retardation element is adapted for converting quickly continuous wave radiation from a gaseous gain medium from a linear polarization state to an orthogonal linear polarization state and vice versa. The retardation element, preferably a quarter wave plate, is adapted for providing a fixed optical bias to create an orthogonal linear polarization state of the intracavity radiation in the absence of a voltage applied to the electrooptical crystal. Additionally the combination of the electrooptical crystal, the retardation element and a polarization coupler is capable of Q-switching and cavity dumping radiation from a gaseous gain medium such as carbon dioxide to provide an output pulse having a pulse width between ten and three hundred nanoseconds. The pulse width of the output pulse is electronically adjustable by varying the slope or fall time of the voltage pulse on the electrooptical crystal. Pulse repetition frequencies in excess of twenty-five kilohertz are obtainable by pulsing the voltage applied to the electrooptical modulator at frequencies of up to at least twenty-five kilohertz. Additionally, with a carbon dioxide gain medium, the laser cavity is capable of being tuned with a grating forming one end of the laser cavity to obtain optical pulses having a wavelength variable from the R32 line at 10.17 microns through the P38 line at 10.79 microns. Increasing the band of the retardation element increases the range of oscillating lines that can be cavity dumped from the resonator. Additionally, the duration of the voltage applied to the modulator is controlled to provide termination of the voltage near the peak of the intracavity Q-switch buildup to maximize the power of the laser output pulse. Also, variations in the duration of the voltage applied to the modulator will provide corresponding variations in the energy of the laser output pulse. In addition, within the bandwidth of a given retardation element any transition that will oscillate within a laser can be Q-switched and cavity dumped. A hydrogen fluoride gain medium is capable of generating pulse outputs at 2.8 microns having a pulse width of fifteen nanoseconds at a pulse repetition frequency of fifty kilohertz. A deuterium fluoride gain medium is capable of generating output pulses at 3.8 microns.

An advantage of the present invention is the ability to obtain laser pulses from a continuous wave laser having a variable pulse rate frequency, variable submicrosecond pulse width and variable wavelength capability. Additionally the use of an optical biasing element such as the quarter wave plate eliminates the requirement of a high DC voltage and associated problems of power dissipation and voltage breakdown of the electrooptic modulator. Additionally, high voltage coupling to the modulator is simplified and the inherent problem of nonohmic contacts which can prevent achieving voltage induced birefringence with direct current electric fields for times longer than the dielectric relaxation time of the crystal is avoided. Also, changes in the oscillator gain which results in variations of the Q-switch buildup time, can be easily compensated for by varying the temporal width of the voltage pulse allowing the intracavity energy to always be dumped at or near the peak intracavity intensity. Also the short pulse operation can be applied to any gain medium that can be Q-switched and linearly polarized and for which an electrooptic material exists. Since the pulse repetition frequency is electronically selected, pulse repetition rates up to the inverse of the medium recovery time can be provided with output pulses having near constant energy. For carbon dioxide this would be at least one hundred kilohertz and in the hydrogen fluoride/deuterium fluoride gain medium higher rates can be obtained. The present invention provides pulses of laser radiation having a duration in the range between a few nanoseconds to three hundred nanoseconds which is suitable for laser radar or communication type applications.

The foregoing and other objects, features and advantages of the present invention will become more apparent in the light of the following detailed description of preferred embodiments thereof as discussed and illustrated in the accompanying drawing.

BRIEF DESCRIPTION OF THE DRAWING

FIGS. 2A, 2B and 2C are simplified diagrams showing the effect of the intracavity elements on the polarization state of radiation circulating within the cavity;

FIG. 3 shows a graph of the variation of optical pulse width in accordance with the present invention;

FIG. 4 shows a typical optical pulse generated in accordance with the present invention.

DETAILED DESCRIPTION OF THE PREFERRED EMBODIMENT

The present invention is a method for providing fast switching of a laser having a gaseous gain medium adapted for continuous wave operation to Q-switch and cavity dump optical flux within the laser to obtain an optical pulse having an electronically variable pulse width with a submicrosecond duration and capable of providing the optical pulses at a high pulse repetition frequency and variable wavelength.

Figure 1:
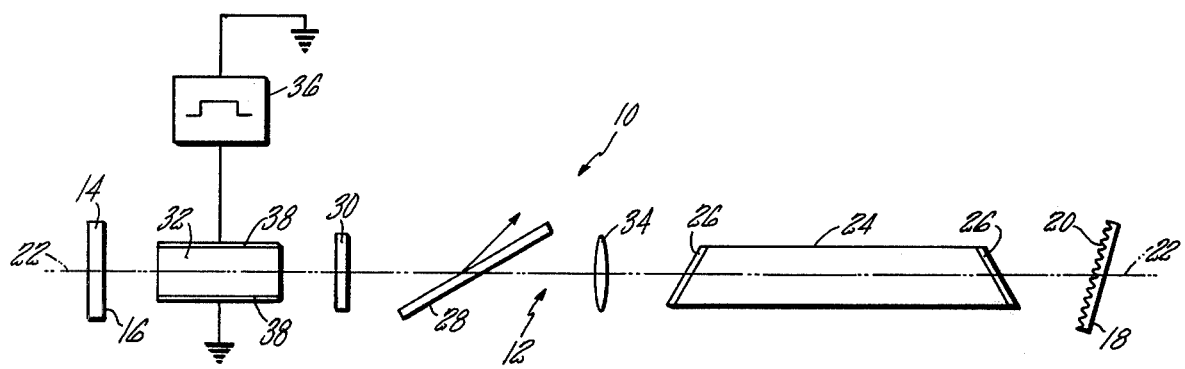
FIG. 1 shows a simplified schematic of the principal elements of a laser capable of being Q-switched and cavity dumped in accordance with the present invention.

FIG. 1 shows a schematic diagram of a laser 10 capable of providing pulses with a submicrosecond duration at a high pulse repetition frequency. The laser 10 has a cavity 12 defined at one end by a first reflector 14 having a reflective surface 16 and at the other end by a second reflector 18 having a reflective surface 20 in the form of a grating wherein the first reflector and the second reflector are symmetrically disposed about an optical axis 22. The cavity 12 includes a gain tube 24 having transmission windows 26 angularly disposed at the Brewster angle to the optical axis 22, a polarization coupler 28 angularly disposed at the Brewster angle to the optical axis 22, a retardation element such as a quarter wave plate 30 disposed in a perpendicular relationship to the optical axis 22, an electrooptic polarization modulator 32, and a coupling lens 34. A voltage source 36 is connected across electrodes 38 deposited on opposite sides of the electrooptical modulator 32. The electrooptical modulator, the quarter wave plate, the polarization coupler, the coupling lens, and the gain tube are respectively disposed within the cavity symmetrically about the optical axis 22.

In the preferred embodiment, the gain tube 24 includes a gain medium typically containing carbon dioxide-nitrogen-helium and is constructed and operated in the conventional manner well known in the art to provide a population inversion therein capable of sustaining continuous wave operation. For a carbon dioxide gain medium, the transmission windows 26 of the gain tube are made of zinc selenide (ZnSe) or other well known infrared transmissive material and the electrooptic polarization modulator is made of material capable of having an electrooptical effect in the infrared spectrum such as cadmium telluride (CdTe) or galium arsenide (GaAs) both of which have relatively large electrooptical coefficients and low bulk absorption coefficients in the ten micrometer wavelength region. The CdTe crystal is commercially available in a variety of geometries. The polarization coupler is preferably made of material having a high index of refraction such as gallium arsenide (GaAs).

To efficiently generate output pulses having a high peak power, with submicrosecond pulse widths capable of being varied from ten to three hundred nanoseconds from a carbon dioxide laser, a method of Q-switching the laser and cavity dumping the intracavity energy at its peak with a controllable pulse width at a high pulse repetition frequency is desirable for many applications. FIGS. 2A, 2B and 2C illustrate the operating principle of an electrooptically Q-switched and cavity dumped laser in terms of the various polarization states within the laser as the modulator voltage is varied between zero and an equivalent quarter wave voltage. The laser configuration as shown in FIG. 2A is the laser configuration shown in FIG. 1. FIG. 2B depicts a polarization state of the radiation circulating within the cavity 12 shown in FIG. 2A for the case where no voltage is applied to the modulator and the coupling loss of the cavity is high. Intracavity radiation having a polarization state such as linear polarization as represented by the vertical arrows 40 in FIG. 2B passes through the quarter wave plate 30 located at position A which converts the linear polarization state to a circular polarization state as represented by the large circles 41. The circular polarization radiation passes unchanged through the electrooptical modulator and is incident onto the reflector 14 and reflected back through the quarter wave plate when the circular polarization state is converted to an orthogonal linear polarization state which when incident onto the polarization coupler 28, located at position B, is reflected out of the cavity. FIG. 2C illustrates the condition when an equivalent retardation voltage is applied to the electrooptical modulator 32 and the coupling loss of the cavity is low. Radiation having a linear polarization state again represented by the vertical arrows 40, passes through the quarter wave plate where it is converted to circular polarization 41 and then through the electrooptical modulator where the circular polarization is converted to an orthogonal linear polarization state represented by the small circles 42. The radiation is then reflected from the first reflector 14 and again passes through the electrooptical modulator where the orthogonal linear polarization is converted to circular polarization and then passes through the quarter wave plate where the circular polarization is converted to linear polarization. The linear polarization radiation incident onto the polarization coupler is transmitted therethrough with little or no radiation coupled out of the cavity.

It is to be recognized that depending on the orientation of the quarter wave plate and the electrooptical modulator axes, an equivalent result to that depicted in FIG. 2C can result in linear polarization occurring at position C of FIG. 2C instead of the orthogonal linear polarization as shown. The descriptive process as shown in FIG. 2B results in spoiling any continuous wave oscillation within the laser cavity with the resulting elimination of output radiation. The electrical pulse imposed on the electrooptical crystal as depicted in FIG. 2C cancels or adds to the fixed optical bias provided by the quarter wave plate and removes quickly the polarization loss from the cavity causing the laser to Q-switch. Near the peak of the intracavity Q-switch buildup, the electrical pulse on the electrooptical modulator is terminated causing the intracavity flux to be switched to the orthogonal linear polarization state after a round trip through the wave plate. This orthogonal linear polarized energy is then dumped out of the cavity by the polarization coupler as an optical pulse having a submicrosecond pulse width. It is to be recognized that the polarization coupler 28 shown in FIGS. 2B and 2C is shown located in only one leg of the circulating radiation only for purposes of description.

As is well known in the art an induced optical phase difference of $\pi$ radians in an electrooptical modulator will cause all of the incident linear polarized radiation to emerge from the crystal with completely orthogonal linear polarization. The voltage that would yield a retardation equal to $\pi$ radians is termed the half wave voltage. A typical modulator of cadmium telluride having a height of four millimeters and an electrode length of fifty millimeters, in a double pass system, will yield one hundred percent depth of modulation or a ninety degree rotation of the incident polarization vector for an applied voltage of approximately two thousand one hundred volts.

The coupling coefficient of the electrooptical modulator and quarter wave plate arranged as shown in FIG. 1, which is equivalent to a time variable transmissivity of a mirror, is given by equation (1).

$$C_m(t) = \sin^2\left[\frac{\pi}{2} + \Gamma(t)\right] \quad (1)$$

where $\Gamma(t)$ is the single pass induced phase retardation through the crystal and $$\frac{\pi}{2}$$

is the fixed single pass retardation through the quarter wave plate. When a sufficient voltage is applied to the crystal, the percentage of flux incident on the polarization coupler which has been converted to orthogonal linear polarization can be made sufficiently small such that the loss caused by the power coupled out of the cavity is reduced to almost zero, allowing a high intensity Q-switch to develop within the cavity. This condition is referred to as the low loss state of the cavity. If the crystal voltage is then returned to zero, the flux incident onto the polarization coupler returns to an orthogonal polarization state after a round trip through the wave plate/modulator combination and the cavity is in a condition which is referred to as the high loss state. If the modulator voltage is returned to zero during the duration of the intracavity Q-switch buildup of optical flux, then a fraction of the optical flux will be coupled out of the cavity by the polarization coupler 28 as a pulse having an optical power $P_2$ approximated by equation (2)

$$P_2 = KC_M P_1 \quad (2)$$

where $P_1$ is the circulating optical flux within the laser, $C_M$ is the modulator coupling coefficient as determined from equation (1) and K is the coupling coefficient which can be as high as 0.78 for a single surface reflection of orthogonal linear polarization from a germanium polarization coupler. If the modulator voltage is zero, then $C_M$ is equal to one. For this case maximum optical flux can be coupled out of the high Q, low loss cavity in a time as short as the cavity round trip time provided that the fall time of the voltage across the electrooptical modulator is very short. A long fall time of the voltage pulse will result in optical radiation being coupled out of the cavity having pulse widths longer than the cavity round trip time.

The prior art electrooptic modulation techniques for the generation of a Q-switched output pulse from a carbon dioxide gain medium operating in a continuous wave mode have previously utilized continuous high voltage bias levels on the electrooptical modulator to provide the coupling loss to keep the laser below threshold. The present invention as shown in FIG. 1 employs an optical biasing element, i.e., a quarter wave plate, whose birefringence provides sufficient coupling loss to prevent continuous wave laser oscillations. The utilization of the quarter wave plate offers the advantage of not requiring continuous high voltage on the modulator at all times and simplifies the high voltage pulse coupling to the modulator. The utilization of the quarter wave plate in combination with a CdTe modulator avoids the potential difficulties of obtaining voltage induced birefringence when the voltage is applied for times exceeding the dielectric relaxation time of the crystal. For a carbon dioxide gain medium the quarter wave plate 28 is typically formed of cadmium sulphide material. In combination with a high index of refraction polarization coupler, a double pass through the quarter wave plate causes all of the radiation having one polarization state such as linear polarization passing therethrough to be converted to an orthogonal polarization state such as orthogonal linear polarization which is capable of producing a very high coupling loss to the cavity.

Referring again to FIG. 1, the voltage source 36 is preferably a high power pulse generator capable of providing pulses with voltage levels up to at least two and one-half kilovolts and having a rise and fall time capable of being varied from approximately ten nanoseconds to at least three hundred nanoseconds. The reflective surface of the second reflector 18, a diffraction grating typically having one hundred fifty lines per millimeter for operation with a carbon dioxide gain medium, is adjusted to preclude operation of the laser at wavelengths that are not compatible with the quarter wave plate such as the 9.4 micrometer wavelength radiation. The coupling lens 34 is inserted into the cavity to match a large beam waist at the grating to a small beam waist at the face of a four millimeter by four millimeter by forty-five millimeter cadmium telluride electrooptical modulator. It is to be recognized that other means could be utilized rather than the lens to create a low loss resonator configuration, that efficiently couples the gain tube with the modulator. It is also to be recognized that a waveguide tube could be utilized rather than the large bore gain tube. If the diameter of the bore of the waveguide is sufficiently small, the lens may be eliminated.

The system as described is inherently capable of high repetition rates limited only by the gain and the recovery time of the gain medium. Additionally the pulse width of the optical power coupled out of the resonator can be varied by adjusting the fall time of the electrical voltage impressed on the modulator. FIG. 3 shows a graph of the variation of the pulse width of the output pulse as a function of the fall time of the voltage on the modulator. Also shown is the variation of peak output power as a function of voltage fall time for a voltage pulse repetition frequency of ten kilohertz. As can be seen from the graph, continuously variable pulse widths of the output pulse can be obtained by controlling the fall time of the voltage impressed on the modulator. FIG. 3 shows output pulse widths variable between ten and one hundred ten nanoseconds. Pulse widths in excess of three hundred nanoseconds are obtainable.

FIG. 4 shows a typical oscillograph trace of a voltage pulse, having a square wave configuration with an approximate fifty nanosecond rise and fall time and a voltage level of twenty-seven hundred volts applied to an electrooptical modulator and also the pulse shape of the resultant Q-switched and cavity dumped optical pulse. The optical pulse has a pulse width of approximately thirty-five nanoseconds at the full width half maximum point with a peak power of approximately three kilowatts. By utilizing the graphs as shown in FIG. 3, a twenty nanosecond voltage fall time would be expected to generate output pulses having peak powers in excess of five kilowatts.

Figure 5:
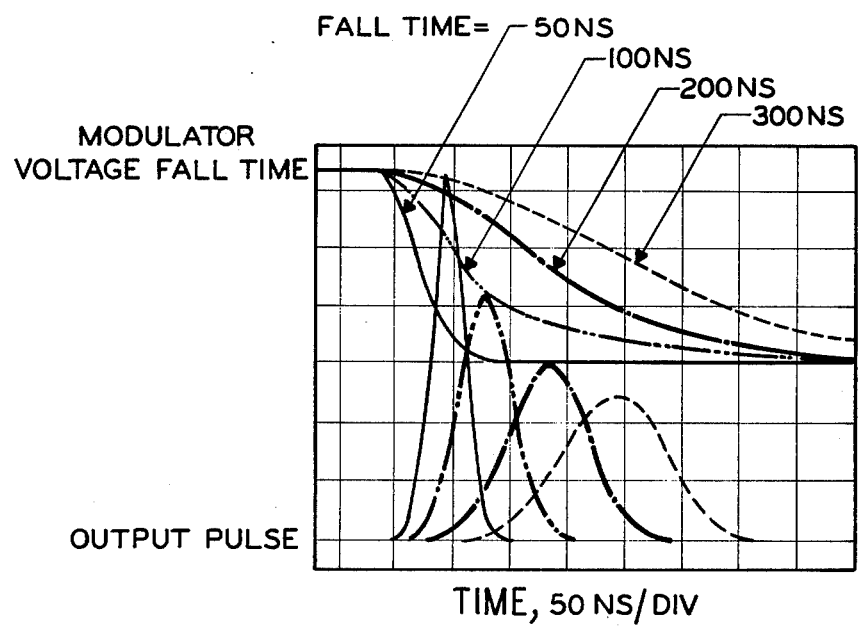
FIG. 5 shows typical pulse shapes of the output pulse as a function of the fall time of the voltage applied to the modulator.

FIG. 5 shows a representative dual beam oscillograph trace of the modulator voltage fall time and the respective pulse shape of the output pulse corresponding to each voltage fall time. As can be seen a one hundred nanosecond fall time results in an optical pulse having approximately a fifty nanosecond pulse width at the full width half maximum point. The energy level of the output pulse is controllable by controlling the time duration the voltage is applied to the modulator. Maximum energy is obtained by timing the termination of the voltage to the maximum Q-switch buildup. Voltage durations more than or less than the time for maximum Q-switch buildup will result in a reduced energy in the output pulse.

The present invention is capable of generating optical pulses having variable pulse repetition frequencies at rates up to the inverse of the gain medium recovery time with each pulse having a nearly constant energy level. For a carbon dioxide gain medium this would be on the order of one hundred kilohertz and for a gain medium of hydrogen fluoride and/or deuterium fluoride it would be even faster. It is to be recognized that this technique can be applied to any laser medium that is capable of being Q-switched with intracavity radiation capable of being linearly polarized and for which an electrooptical material exists. Materials are known which enable the operation of the present invention over the range from ultraviolet through the visible and into the far infrared lasers.

The present invention is adapted for line tuning the laser to operate on the various transitions of the gain medium. The grating surface 20 as shown in FIG. 1 can be angularly positioned with respect to the optical axis 22 to vary the line for which the laser is emitting. For a carbon dioxide gain medium, the laser can be made to produce cavity dump pulses over the range of transitions from the P38 line through the R32 line at ten microns wavelength. It is to be expected that the range of oscillating lines which can be made to operate is limited only by the bandwidth of a fixed quarter wave plate that provides the optical bias for the Q-switch buildup and by the gain medium. A wide band Fresnel prism can be utilized to provide a fixed quarter wave optical bias throughout the oscillation spectrum of the $CO_2$ gain medium. The elements as shown in FIG. 1 can also be utilized to produce a mode locked output pulse having high energy with a pulse width of one nanosecond or less. Superimposing simultaneously of the modulator voltage, a sinusoidal signal at a frequency of C/4L where L is the cavity length, results in the Q-switch buildup as previously described with the added feature that the radiation within the Q-switched envelope is mode-locked. The mode locked pulse oscillates within the laser with a high intensity. Terminating the voltage when the recirculating pulse is at its peak amplitude will cavity dump the mode locked pulse with its characteristically short pulse width.

While this invention has been particularly shown and described with reference to preferred embodiments thereof, it will be understood by those skilled in the art that the foregoing and other changes in the form and detail thereof may be made therein without departing from the spirit and the scope of the invention.

Having thus described a typical embodiment of our invention that which we claim as new and desire to secure by Letters Patent of the United States is:

1. A method of obtaining pulses of radiation having pulse widths capable of being controllably variable over a submicrosecond time interval with a laser having a gaseous gain medium, means for controlling the polarization state of radiation capable of oscillating within the laser, and means responsive to the polarization state for coupling out radiation from the laser comprising:

energizing the gain medium to obtain a population inversion therein capable of providing continuous wave radiation oscillating within the laser;

providing a first polarization state, to at least a portion of radiation within the laser incident onto the means responsive to the polarization state, with the means for controlling the polarization state of the radiation wherein the means responsive to the polarization state is adapted for coupling out of the laser radiation having the first polarization state thereby providing a high coupling loss to the laser to maintain the gain of the laser below threshold for producing an output beam;

on switching the means for controlling the polarization state of the radiation to change quickly the first polarization state to a second polarization state wherein radiation having the second polarization state is transmitted through the means responsive to the polarization state thereby producing low coupling loss to the laser to allow a Q-switch buildup of optical flux within the laser;

off switching the means for controlling the polarization state of the radiation to change the second polarization state to the first polarization wherein the optical flux having the Q-switch buildup is cavity dumped by the means responsive to the polarization state to obtain an output pulse having a submicrosecond duration; and controlling the time duration of off switching the means for controlling the polarization state to control the pulse width of the output pulse.

2. The invention in accordance with claim 1 further including repetitively switching the means for controlling the polarization state at a high repetition frequency to obtain laser output pulses at a high pulse repetition frequency.

3. The invention in accordance with claim 2 wherein the means for controlling the polarization state is switched at a frequency less than one hundred kilohertz.

4. The invention in accordance with claim 1 further including controlling the time duration between on switching and off switching the means for controlling the polarization state to control the energy level of the output pulse by controlling the timing of cavity dumping the Q-switch buildup of the optical flux within the laser.

5. The invention in accordance with claim 4 wherein the time duration between on switching and off switching is controlled to cavity dump the optical flux at maximum Q-switch buildup to maximize the energy of the output pulse.

6. The invention in accordance with claim 1 wherein the time duration of off switching the means for controlling the polarization is less than three hundred nanoseconds resulting in an output pulse having a pulse width less than three hundred nanoseconds.

7. The invention in accordance with claim 1 further including adjusting the control of the time duration of off switching to obtain time durations variable between twenty nanoseconds and three hundred nanoseconds thereby producing output pulses having pulse widths variable between twenty nanoseconds and one hundred twenty nanoseconds.

8. The invention in accordance with claim 1 further including tuning the laser by angularly rotating a grating forming one end of the laser cavity to obtain radiation oscillating within the laser having a wavelength within the band of the means for controlling the polarization state of the radiation.

9. A method of obtaining pulses of radiation having pulse widths capable of being controllably variable over a submicrosecond time interval with a laser having a gaseous gain medium, an electrooptic modulator, a retardation element, and a polarization coupler for coupling out radiation from the laser comprising:

energizing the gain medium to obtain a population inversion therein capable of providing continuous wave radiation oscillating within the laser;

providing a first polarization state, to at least a portion of radiation within the laser incident onto the polarization coupler by orienting the retardation element with respect to the electrooptic modulator to obtain the first polarization state with no voltage applied to the modulator wherein the polarization coupler is adapted for coupling out of the laser radiation having the first polarization state thereby providing a high coupling loss to the laser to maintain the gain of the laser below threshold for producing an output beam;

applying an equivalent retardation voltage to the electrooptic modulator to switch quickly the first polarization state to a second polarization state wherein radiation having the second polarization state is transmitted through the polarization coupler thereby producing low coupling loss to the laser to allow a Q-switch buildup of optical flux within the laser;

terminating the voltage applied to the electrooptic modulator to switch the second polarization state to the first polarization thereby cavity dumping the optical flux having the Q-switch buildup with the polarization coupler to obtain an output pulse having a submicrosecond duration; and controlling the fall time of the voltage termination to control the pulse width of the output pulse.

10. The invention in accordance with claim 9 wherein the rate of the fall time of the voltage termination is controlled to between twenty to three hundred nanoseconds to obtain output pulses having pulse widths capable of being controllably varied between twenty to one hundred twenty nanoseconds.

11. The invention in accordance with claim 10 further including pulsing the voltage applied to the electrooptic modulator at a pulse repetition frequency up to at least twenty-five kilohertz to obtain output pulses at a pulse repetition frequency of at least twenty-five thousand pulses per second.

12. The invention in accordance with claim 11 further including controlling the pulse width to control the energy level of the output pulse.

13. The invention in accordance with claim 9 further including simultaneously superimposing a sinusoidal signal on the voltage applied to the modulator to mode lock the Q-switch buildup to obtain a mode locked output pulse having high energy with a pulse width of one nanosecond or less.

* * * * *